N. M. KIRSHNER.
SCARF PIN RETAINER.
APPLICATION FILED NOV. 18, 1914.
1,154,408.
Patented Sept. 21, 1915.
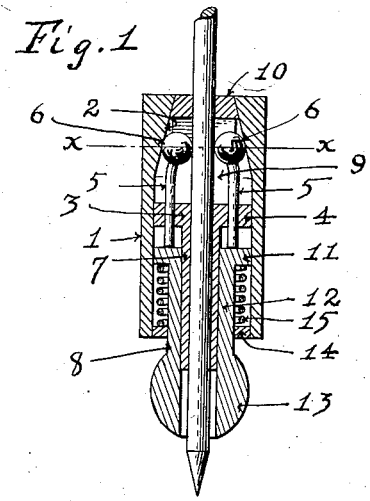
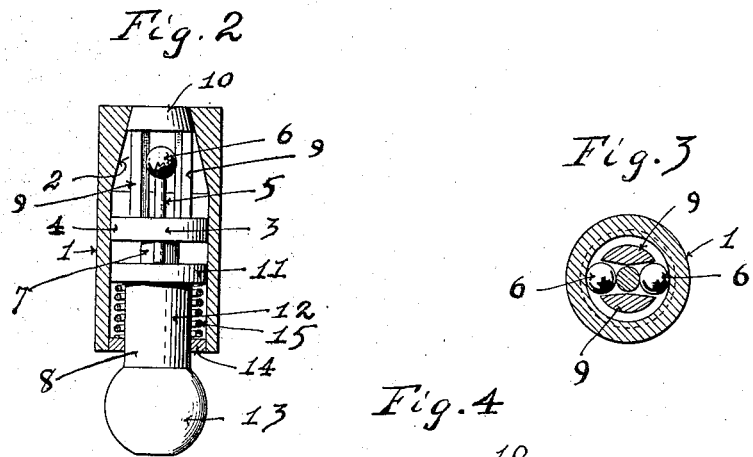
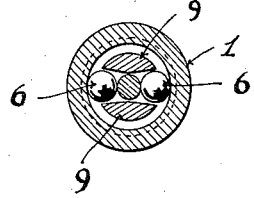
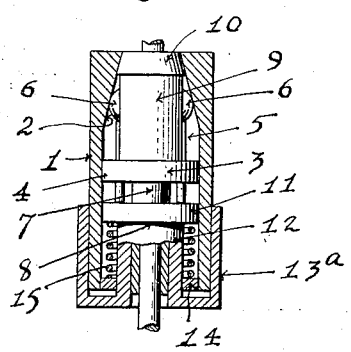
WITNESSES:
Richard Sommer
J. Edw. Thebaud
INVENTOR
Nathaniel M. Kirshner
BY
A. J. Sangster
ATTORNEY

UNITED STATES PATENT OFFICE.

NATHANIEL M. KIRSHNER, OF BUFFALO, NEW YORK.

SCARF-PIN RETAINER.

1,154,408.

Specification of Letters Patent.

Patented Sept. 21, 1915.

Application filed November 18, 1914. Serial No. 872,794.

*To all whom it may concern:*

Be it known that I, NATHANIEL M. KIRSHNER, a citizen of the United States, residing at Buffalo, in the county of Erie and State of New York, have invented a certain new and useful Improvement in Scarf-Pin Retainers, of which the following is a specification.

My invention relates to a pin retainer, and more particularly to a retainer or guard for scarf-pins, stick-pins, hat-pins, and the like.

The object of my invention is to provide a simple, effective device which will engage the wire body of a pin of the types mentioned and prevent extraction by theft or accident; a device which is readily adjustable upon the pin body and which may be removed readily when desired. Other and further objects of my invention will be evident from the following specification and the annexed drawings forming a part thereof, in which,—

Figure 1 is a vertical central section of my invention showing it in engagement with the body of a pin. Fig. 2 is a view partly in section at right angles to the plane section of Fig. 1. Fig. 3 is a section on the line $x$—$x$ of Fig. 1. Fig. 4 is a view similar to Fig. 2 but at right angles thereto and showing a modified form of the sliding member as hereafter described.

The device comprises a hollow, cylindrical body portion 1, the interior of which is cylindrical except at the upper portion, where it is conically contracted as shown at 2, thus forming a cone wall for engagement with the friction pins, as hereafter described.

Fitting within the body 1 is a fixed member 3 which is held frictionally against movement within the body 1 by being tightly fitted therein. This fixed member 3 consists of a disk-shaped portion 4 which engages with the inner walls of the body 1 and which is diametrically bored to receive the stems 5 of the friction pins 6. The friction pins 6 consist of stems 5 having enlarged upper ends, forming heads, preferably globular in form, made either integral with the stems 5 or rigidly secured thereto. And in the use of the term "friction pins" or "friction pin 6" in this specification and in the claims, that term is to be understood as meaning friction pins having enlarged upper ends as just described. This fixed member 3 has a sleeve portion 7 which is bored to receive the pin and over which the movable member 8 slides. Secured to or integral with the disk-shaped portion 4 are two pillars 9, 9, arranged at right angles to the borings in said disk-shaped part within which the friction pins 6 slide axially, and the upper ends of these pillars 9, 9, have a cone-shaped cap 10 which fits within the cone wall 2. The borings for the friction pins 6 are sufficiently large to permit axial and lateral movement of the pins therein.

The movable member 8 consists of a disk-shaped upper portion 11 which slides freely within the walls of the body portion 1, and upon the upper surface of which the stems 5 of the pins 6 rest. The sleeve portion of this member 8 takes over the sleeve portion 7 of the member 3, and the outside diameter of the sleeve portion 12 is sufficiently less than the inside diameter of the body 1 to form an annular space for a compression spring 15. The compression spring 15 bears against the under side of the disk 11 and against a washer or ring 14 which fits tight into the bottom of the body 1. The lower end of the part 8 may be in the form of a bulb 13, as shown in Figs. 1 and 2, which is readily grasped, or it may have a cup form, as shown in Fig. 4 at 13ᵃ, taking over the part 1.

In operation, when a pin is inserted, the pin will tend to force the friction pins 6 downwardly and apart to permit the pin to pass. When the pin is in place the spring 15 will force the member 8 upwardly and its disk-shaped upper portion bearing against the stems 5 of the friction pins 6 and will force them upwardly and cause the friction pins 6 to be deflected inwardly by the cone surface 2 and into frictional contact with the pin to be held and thus grip and hold it.

The device is readily removed by pulling upwardly upon the part 1 and downwardly upon the part 8 at the same time, when it may be slipped off from the pin.

Having thus described my invention, I claim:—

1. A pin retainer of the type described comprising a cylindrical body portion having its interior cylindrical except at its upper portion which is cone-shaped, a member rigidly secured therein having borings to receive the stems of friction pins, friction pins having their stems sliding in said borings the upper ends of which friction pins are adapted to contact with said cone-shaped surface of said body portion, a sliding member within said body portion engaging against the stems of said friction pins and a spring for forcing said sliding member upwardly in said body portion.

2. A pin retainer of the type described comprising a body portion, a disk and sleeve member within said body and held rigidly therewith, having borings to receive the stems of friction pins and centrally bored to receive the pin to be held, friction pins slidably held in said borings, a sliding member in said body engaging the stems of said friction pins and a spring for forcing said sliding member upwardly within said body.

NATHANIEL M. KIRSHNER.

Witnesses:
   D. H. Harper,
   J. Edw. Thebaud.